United States Patent [19]

Shinkai et al.

[11] Patent Number: 5,308,689
[45] Date of Patent: May 3, 1994

[54] SNAG-RESISTANT COMPOSITE FABRIC

[75] Inventors: Tsunehisa Shinkai; Toshikazu Sato; Takashi Imai, all of Okayama, Japan

[73] Assignee: Junkosha Company, Ltd., Tokyo, Japan

[21] Appl. No.: 16,821

[22] Filed: Feb. 10, 1993

[51] Int. Cl.$^5$ .................. A41D 31/02; B32B 5/24; B32B 33/00
[52] U.S. Cl. .................. 428/229; 428/315.5; 428/252; 428/908.8; 428/911
[58] Field of Search .................. 428/229, 315.5, 908.8, 428/911, 252

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 55/528 |
| 4,194,041 | 3/1980 | Gore et al. | 428/315 |
| 4,942,214 | 7/1990 | Sakhpara | 528/59 |
| 5,022,096 | 6/1991 | Pacanowsky | 2/227 |

Primary Examiner—James C. Cannon
Attorney, Agent, or Firm—Gary A. Samuels

[57] ABSTRACT

A waterproof and water-vapor-permeable composite laminated material that has good snag resistance and puncture resistance is described. The material is suitable for making outdoor apparel for wear in rugged environments, for example, where brambles, briers or dense underbrush are likely to be encountered.

6 Claims, 1 Drawing Sheet

SNAG-RESISTANT COMPOSITE FABRIC

FIELD OF THE INVENTION

This invention relates to waterproof water-vapor-permeable fabric for outdoor apparel, more particularly, to fabric having resistance to damage by snagging, puncturing, or penetration by thorns, briers, and other prickly objects.

BACKGROUND OF THE INVENTION

Waterproof fabrics for use in outdoor apparel suitable for wear in most rugged physical environments and weather conditions are well known. These fabrics are usually quite heavy and are typically made from yarns of high strength abrasion-resistant synthetic polymer fibers woven in tight smooth patterns having a high yarn count in both warp and fill directions. Such fabrics when coated with a continuous layer of polyvinyl chloride, polyurethane polymers, or other such compounds can be made into waterproof garments for protection in rainy or inclement weather. An example of such a coated fabric is a plain weave fabric of synthetic polymer yarn with a yarn count of 65×60 yarns per inch (210 denier, 24 filament yarn) that has been coated with a layer of polyvinyl chloride, polyurethane, or other such polymer. These continuous waterproof coating materials, however, do not permit passage of air or water vapor (from perspiration) through them and, consequently, the garments can become quite stuffy and uncomfortable to the wearer. Furthermore, when scratched by thorns, prickles, branches, and other sharp objects while traversing dense brush and brambles the coating may be punctured or worn off and a measure of the waterproofness lost.

Also known is weather-resistant waterproof and breathable outdoor apparel made from composite laminated fabric which consists of textile fabric laminated to a porous hydrophobic polymer film. The porous hydrophobic polymer film, which may also be formed as a composite in combustion with hydrophilic polymeric materials, resists the passage of liquid water but will readily transmit water vapor through it, i.e., is breathable, thus significantly increasing wearer comfort. Exemplary of materials and garments utilizing this method for weather resistance and waterproofness are those fashioned from GORE-TEX ® membrane and GORE-TEX ® fabric laminates prepared according to U.S. Pat. Nos. 4,194,041 (Gore, et al.), U.S. Pat. No. 4,187,390 (Gore), and U.S. Pat. No. 3,953,566 (Gore) which include films of porous expanded polytetrafluoroethylene, characterized by having a structure of nodes interconnected by fibrils, laminated to at least one layer of a textile fabric.

Despite the use of heavy densely woven outer fabrics in the apparel described above, when worn where dense brush or thickets of brambles, briers and other thorny bushes are routinely encountered, most are not entirely satisfactory in preventing damage to the garment or in protecting the wearer from injury or discomfort. Harm arising from sharp objects present in brambles, briers, and other dense brush can occur by immediate tearing or puncturing of the garment as the wearer passes through them or, more insidiously over a period of time, from thorns, prickles, and other sharp or needle-like objects that are picked up or become embedded in the outer fabric and, by movement of the yarn and weave of the fabric, are forced through to the wearer's side of the garment. In either case, physical damage to the garment, loss of waterproofness, and discomfort or injury to the wearer can result.

SUMMARY OF THE INVENTION

This invention provides a waterproof water-vapor-permeable composite laminated material which has high resistance to snagging or puncturing by thorns, prickles, and other sharp pointed objects, and which substantially reduces attachment or embedding of such sharp objects in the fabric, and which substantially prevents penetration into or through the fabric of such sharp objects if they become attached to the fabric.

The waterproof water-vapor-permeable composite laminated material of the invention comprises a waterproof water-vapor-permeable layer of synthetic polymer laminated to a protective layer of woven fabrics of yarns of synthetic polymer; the fabric having the combination wherein:

(a) the fabric has a cover factor of 2000 or more, (b) the fabric has a thickness of 200 micrometers or more and (c) the yarns are formed of monofilaments of 1.5 denier or less; which combination causes the fabric to be substantially resistant to snagging, puncturing, attachment or penetration by small sharp objects.

Waterproof as used herein is meant having water-penetration-resistance (hydrostatic resistance) of 6.8 kPa (1.0 psi) or more.

Water-vapor-permeable as used herein is meant having a water-vapor-transmission rate of 2,000 g/m2/24-hours or more.

Cover factor as used herein is a value descriptive of the density of woven fabric. The cover factor value, which is based on the combined effect of the yarn size and the yarn count in the warp and fill directions of the fabric, is calculated from the following expression:

$$\text{Cover Factor} = (W^{\frac{1}{2}} \times M) + (F^{\frac{1}{2}} \times N) \text{ where}$$

W=warp yarn size expressed in denier
M=number of warp direction yarns per inch
F=fill yarn size expressed in denier
N=number of fill direction yarns per inch The layer of synthetic polymer can be a waterproof water-vapor-permeable coating or film selected from many known in the art, laminated to the puncture- and snag-resistant woven fabric. For example, the synthetic polymer coating or film can be a polyolefin, polyurethane, fluoropolymer, or the like. The water-vapor-permeable synthetic polymer film can be porous or non-porous. Preferably, the synthetic polymer coating or film is a porous fluoropolymer film, more preferably a porous polytetrafluoroethylene film, most preferably a porous expanded polytetrafluoroethylene film.

The water-vapor-permeable synthetic polymer coating or film can be coated with a continuous substantially air-impermeable layer of hydrophilic polymer, most preferably with a hydrophilic polyurethane polymer.

DETAILED DESCRIPTION OF THE INVENTION

With reference to the drawings the article of the invention will be described in detail.

Figure 1:
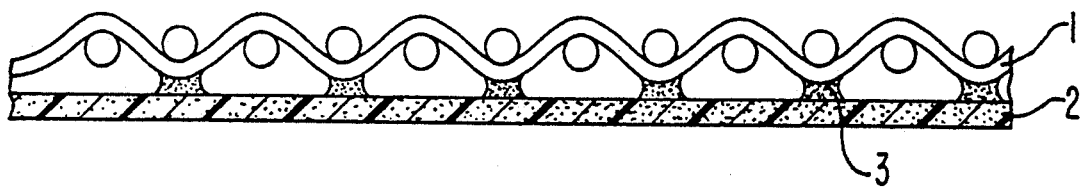
FIG. 1 is a cross-sectional view of the composite layered material of the invention.

In FIG. 1 is depicted an embodiment of the invention having a layer of waterproof water-vapor-permeable synthetic polymer film 2 adhered to a protective layer of woven fabric 1 by a non-continuous layer of adhesive 3.

The synthetic polymer coating or film layer of the composite material of the invention can be selected from many materials knonw in the art. For example, porous or non-porous coatings or films of polyethylene, polypropylene, polyurethane, or fluoropolymers can be used, so long as they are waterproof and water-vapor-permeable as defined hereinabove.

A preferred film is a hydrophobic liquid water-penetration-resistant, water-vapor-permeable porous polytetrafluoroethylene film, preferably a porous expanded polytetrafluoroethylene film having a structure of nodes interconnected by fibrils as described in U.S. Pat. Nos. 3,953,566 and 4,187,390. The water-penetration-resistance (hydrostatic resistance) of the porous polytetrafluoroethylene film is preferably 34 kPa (5 psi) or more, most preferably 172 kPa (25 psi) or more, although films with water-penetration-resistance as low as 6.8 kPa (1 psi) can be successfully used in the composite material of the invention. The water-vapor-transmission rate of the porous polytetrafluoroethylene film should be 2000 $g/m^2/24$-hours or more, preferably 5000 $g/m^2/24$-hours or more, most preferably 8000 $g/m^2/24$-hours or more, to provide the breathability associated with wearer comfort.

The woven fabric 1 of the composite material of the invention is a high-density tightly woven smooth surfaced fabric having a cover factor of 2000 or more. The fabric should have a high yarn count, preferably 100 yarns per inch or more in both the warp and fill directions. The yarn of the fabric is formed of a multiplicity of ultra-fine monofilaments. Each yarn should contain 25 or more, preferably 50 or more, ultrafine monofilaments. The yarn should be of a size 25 denier or greater, more preferably 50 denier or greater. The ultra-fine monofilaments of the yarn are in the size range of 0.01 to 1.5 denier, preferably in the range 0.05 to 1.0 denier. The ultra-fine monofilaments can be made of polyamide, polyester, or other synthetic polymers used to make textile fabrics. The ultra-fine monofilaments can be made of polyamide, polyester, or other synthetic polymers used to make textile fabrics. The ultra-fine monofilaments can also be a bicomponent textile fiber of synthetic polymers such as are used in fabrics available from Kanebo Co., Japan.

It is the combination of the elements described above that provides a fabric having remarkable properties. The fabric has a relatively smooth asperity-free surface compared to conventional fabrics used for outdoor apparel which offers very few locations for thorns, prickles, and other pointed objects to snag. The extremely small diameters of the ultra-thin monofilaments and their close proximity in the yarn, on to another, provide a surface difficult for most prickles and thorns to snag. The yarn formed of the ultra-thin monofilaments is highly flexible and compliant so that there are virtually no holes or passageways large enough in the woven fabric for thorns, prickles, and other sharp needle-like objects to catch on or become embedded in. In addition, the high cover factor construction is highly resistant to puncturing or penetration by thorns, prickles, or other sharp objects in a direction normal to the plane of the fabric due to the high number of yarns and ultra-thin monofilaments that form a dense barrier in their path, thus protecting the integrity of the waterproof water-vapor-permeable film to which it is laminated and preventing injury or discomfort to the wearer of the garment formed of the fabric.

Fabric formed with the combination of elements described above also has excellent breathability, i.e., it has a high water-vapor-transmission rate and, consequently, provides comfort to the wearer of garments made of it. The water-vapor-transmission rate of the fabric should be 3000 $g/m^2/24$-hours or higher, preferably 5000 $g/m^2/24$-hours or higher, most preferably 8000 $g/m^2/24$-hours or higher as measured by the water-vapor-transmission rate test described hereinafter.

The adhesive 3 may be selected from many known in the art. Suitable adhesives may be found in, but not limited to, the classes consisting of thermoplastics, thermosets, or reaction curing polymers. The adhesives may be applied to the surfaces to be laminated by conventional means, for example, by coating or printing methods.

Figure 2:
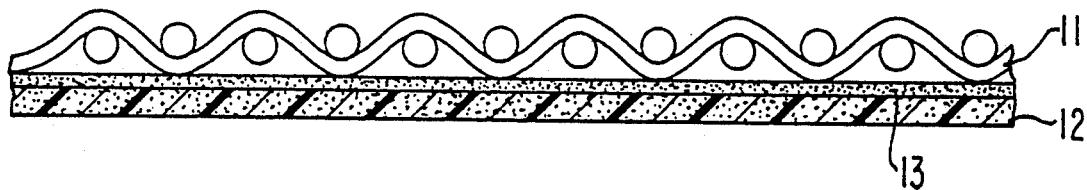
FIGS. 2–4 are cross-sectional views of other embodiments of the composite layered material of the invention.
Figure 3:
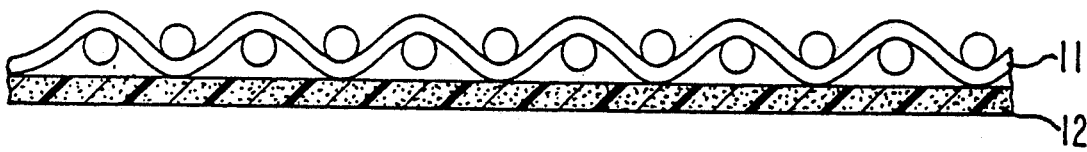

Alternatively, as shown in FIG. 2 the synthetic polymer coating or film 12 can be adhered to the protective fabric 11 by use of a continuous water-vapor-permeable layer of adhesive 13 or, optionally, directly to the fabric without any intervening layer of adhesive as shown in FIG. 3, for example, by application of heat and pressure.

Figure 4:
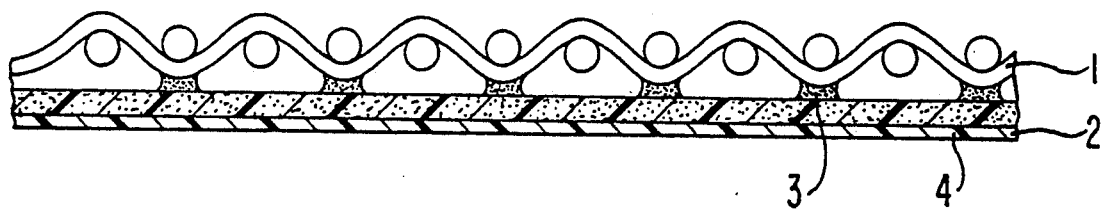

Referring now to FIG. 4 another embodiment of the invention is depicted. A layer of porous water-vapor-permeable synthetic polymer film 2 is coated with a substantially air-impermeable water-vapor-permeable layer 4 of hydrophilic polymer. The porous water-vapor permeable film 2 is adhesively laminated to a protective layer of woven fabric 1 by a non-continuous layer of adhesive 3, the uncoated side of the porous water-vapor-permeable synthetic polymer film 2 facing the woven fabric 1. The woven fabric 1, porous synthetic polymer film 2, and adhesive layer 3 are as described hereinabove.

The hydrophilic polymer layer 4 is a substantially air-impermeable water-vapor-permeable hydrophilic polymer, preferably a hydrophilic polyurethane polymer as described in U.S. Pat. Nos. 4,194,041 (Gore et al) and U.S. Pat. No. 4,942,214 (Sakhpara).

TEST DESCRIPTIONS

Water Vapor Transmission Rate (WVTR)

Potassium Acetate Method

A description of the test employed to measure water vapor transmission rate (WVTR) is given below. The procedure has been found to be suitable for testing films, coatings, and coated products.

In the procedure, approximately 70 ml. of a solution consisting of 35 parts by weight of potassium acetate and 15 parts by weight of distilled water was placed into a 133 ml. polypropylene cup, having an inside diameter of 6.5 cm. at its mouth. An expanded polytetrafluoroethylene (PTFE) membrane having a minimum WVTR of approximately 85,000 $g/m^2/24$ hrs. as tested by the method described in U.S. Pat. No. 4,862,730 to Crosby and available from W. L. Gore & Associates, Inc. of Newark, Del., was heat sealed to the lip of the cup to create a taut, leakproof, microporous barrier containing the solution.

The sample of the fabric to be tested was allowed to condition at a temperature of 23° C. and a relative humidity of 50% prior to performing the test procedure. The sample was mounted to the surface of a water bath. The water bath assembly was controlled at 23° C. plus 0.2° C., utilizing a temperature controlled room and a water circulating bath.

The cup assembly was weighed to the nearest 1/1000 g. and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, and weighed again within 1/1000 g.

The WVTR of the sample was calculated from the weight gain of the cup assembly and was expressed in grams of water per square meter of sample surface area per 24 hours.

Hydrostatic Resistance Test

The hydrostatic resistance of the composite laminated material of the invention was measured using a Mullen-type hydrostatic tester such as described in ASTM D-751-89 (Standard Test Method for Coated Fabrics) Procedure A.

Test specimens, 12.5 cm×12.5 cm or larger, are clamped in the testing machine and water is forced against the underside of the specimen until a pressure of about 196 kPa is reached. The pressure is then held constant within 14 kPa for a period of about 5 minutes and the surface of the specimen examined for the appearance of water. If no water has appeared on the surface of the specimen by the end of the five minute period, the specimen is considered to have a hydrostatic resistance >196 kPa. The fabric will have satisfactorily met the required test if at least eight out of ten specimens show no leakage at the test pressure.

Puncture Resistance Test

Puncture resistance of the composite laminated material of the invention was determined by first challenging the material with 20 sharp pins mounted in a holder followed by a low pressure hydrostatic resistance test of the challenged area.

The pins are mounted in a metal base plate about 29 mm wide×63 mm long. The pins are mounted in 2 pairs of rows parallel with the long edge of the holder. The outermost two rows of pins are centered about 2 mm in from the edge and contain 6 pins each. The innermost two rows of pins are centered about 4 mm in from the edge and contain 4 pins each. The two innermost rows are about 20 mm apart. The pins are made of Type 304 stainless steel, extend about 6 mm above the plate, and taper from a diameter of about 1.2 mm at the base plate to a very sharp point. The pins are tilted slightly from the vertical, away from the long edges.

A flat test surface was provided by a glass plate covered with a sheet of silicone rubber (55 durometer). A test specimen was placed flat on the silicone rubber sheet with the fabric to be tested facing upward. The pin holder was placed with the pins contacting the test specimen, and a 1.5 kg weight carefully placed on the back of the holder for a period of 30 seconds. After 30 seconds the weight and the pin holder were carefully removed from the test specimen. The test specimen was then subjected to a low pressure hydrostatic resistance test which included the area contacted by the sharp pins.

The low pressure hydrostatic resistance test consists essentially of forcing water against one side of a test piece, and observing the other side of the test piece for indications of water penetration through it.

The test specimen was clamped and sealed between rubber gaskets in a fixture that holds the test piece. The fabric surface of the test specimen was in contact with the water and the other side face upward, open to the atmosphere, for close observation. Air was removed from inside the fixture and pressure was applied to the inside surface of the test piece, over an area of 7.62 cm (3.0 inches) diameter, as water was forced against it. The water pressure on the test piece was increased to about 6.9 kPa (1.0 psi) by a pump connected to a water reservoir, as indicated by an appropriate gauge and regulated by an in-line valve.

The fabric surface of the test piece was watched closely for the appearance of any water forced through the material. Water seen on the surface is interpreted as a leak. The sample surface is observed for one minute at test pressure, at which time the number of leaks are counted and recorded.

EXAMPLE 1

A 3/1 twill fabric having a yarn count of 250×140 yarns per inch was woven from 75 denier yarn having 246 monofilaments of about 3.0 denier. The monofilaments were made of bicomponent fibers of polyester (65%) and nylon (35%). The fabric had a cover factor of 3377 and a thickness of 260 micrometers.

The twill fabric was laminated to a film of porous expanded polytetrafluoroethylene having a thickness of about 40 micrometers, a porosity of about 80%, and a nominal pore size of about 0.2 micrometers. A non-continuous layer of adhesive was applied to the porous expanded polytetrafluoroethylene film by gravure printing methods, and the film joined to the fabric by heat and pressure as they passed through the nip of a heated metal roll and a roll having a silicone rubber surface. A waterproof water-vapor-permeable composite laminated material of the invention was produced.

Test specimens of the material were prepared and tested for water-vapor-transmission rate and hydrostatic resistance, after which they were subjected to the puncture resistance test. Test results are presented in Table 1.

EXAMPLE 2

A plain weave fabric having a yarn count of 200×140 yarns per inch was woven from 60 denier yarn having 60 monofilaments of about 1.0 denier. The monofilaments were made of polyester. The fabric had a cover factor of 2634 and a thickness of 270 micrometers.

The plain weave fabric was laminated to a film of porous expanded polytetrafluoroethylene as described in Example 1 above and a waterproof water-vapor-permeable composite laminated material of the invention was produced.

Test specimens of the material were prepared and tested for water-vapor-transmission rate and hydrostatic resistance, after which they were subjected to the puncture resistance test. Test results are presented in Table 1.

EXAMPLE 3

A film of porous expanded polytetrafluoroethylene having a thickness of about 40 micrometers, a porosity of about 80%, and a nominal pore size of about 0.2 micrometers was coated with a continuous air impermeable water-vapor-permeable 8 micrometer thick layer of hydrophilic polyurethane polymer. The coated porous expanded polytetrafluoroethylene film was then laminated to the 3/1 twill fabric of Example 1 and as described in Example 1. A waterproof water-vapor-permeable composite laminated material of the invention as depicted in FIG. 2 was produced.

Test specimens of the material were prepared and tested for water-vapor-transmission rate and hydrostatic resistance, after which they were subjected to the puncture resistance test. Test results are presented in Table 1.

COMPARATIVE EXAMPLE 1

A nylon oxford fabric having a yarn count of 64×59 yarns per inch was woven from 210 denier yarn having 24 monofilaments of about 8.0 denier. The fabric had a cover factor of 1782 and a thickness of 180 micrometers.

The oxford fabric was laminated to a film of porous expanded polytetrafluoroethylene as described in Example 1 to produce a waterproof water-vapor-permeable fabric.

Test specimens of the material were prepared and tested for water-vapor-transmission rate and hydrostatic resistance, after which they were subjected to the puncture resistance test. Test results are presented in Table 1.

COMPARATIVE EXAMPLE 2

A nylon twill fabric having a yarn count of 158×68 yarns per inch was woven from 210 denier yarn having 36 monofilaments of about 6.0 denier. The fabric had a cover factor of 3275 and a thickness of 380 micrometers.

The twill fabric was laminated to a film of porous expanded polytetrafluoroethylene as described in Example 1 to produce a waterproof water-vapor-permeable fabric.

Test specimens of the material were prepared and tested for water-vapor-transmission rate and hydrostatic resistance, after which they were subjected to the puncture resistance test. Test results are presented in Table 1.

COMPARATIVE EXAMPLE 3

A nylon oxford fabric having a yarn count of 65×60 yarns per inch was woven from 210 denier yarn having 24 monofilaments of about 8.0 denier. The oxford fabric was coated with a 20 micrometer thick layer of polyvinyl chloride to produce an air-impermeable waterproof fabric. The fabric had a cover factor of 1811 and a thickness of 180 micrometers.

Test specimens of the material were prepared and tested for water-vapor-transmission rate and hydrostatic resistance, after which they were subjected to the puncture resistance test. Test results are presented in Table 1.

TABLE 1

| | Moisture Permeation ($g/m^2 \cdot$ 24-hours) | Water Pressure Resistance (kPa) | Number of Leaks |
|---|---|---|---|
| Example 1 | 26,000 | >196 | 0 |
| Example 2 | 25,000 | >196 | 0 |
| Example 3 | 15,000 | >196 | 0 |
| Comp. Ex. 1 | 17,000 | >196 | 20 |
| Comp. Ex. 2 | 16,000 | >196 | 20 |
| Comp. Ex. 3 | <500 | >196 | 3 |

It is clear from the data in Table 1 that the composite material of the invention embodied in Examples 1, 2, and 3 has excelled breathability (moisture vapor permeation), high water-penetration-resistance and excellent puncture resistance, a combination of properties heretofore unavailable.

Currently available materials, exemplified by comparative Examples 1, 2, and 3, lacking one or more of the requisite elements of the material of the invention, are shown to be deficient in their ability to protect themselves from puncturing or penetration by sharp objects which can lead to loss of waterproofness and other problems.

We claim:

1. A waterproof water-vapor-permeable composite material comprising
   (i) a waterproof water-vapor-permeable synthetic polymer coating or film laminated to
   (ii) a layer of woven fabric of yarns of synthetic polymer having the combination wherein:
   (a) said fabric has a cover factor of 2000 or more,
   (b) said fabric has a thickness of 200 micrometers or more, and
   (c) said yarns are formed of monofilaments of 1.5 denier or less;
   said combination causing the material to be resistant to snagging, puncturing, attachment or penetration by small sharp objects.

2. The waterproof water-vapor-permeable composite material of claim 1 wherein the waterproof water-vapor-permeable synthetic polymer coating or film is selected from the class consisting of polyolefin, polyurethane, and fluoropolymer.

3. The waterproof water-vapor-permeable composite material of claim 1 wherein the water-vapor-permeable synthetic polymer coating or film is a film of porous polytetrafluoroethylene.

4. The waterproof water-vapor-permeable composite material of claim 3 wherein the porous polytetrafluoroethylene film is a film of porous expanded polytetrafluoroethylene.

5. The waterproof water-vapor-permeable composite material of claims 1, 2, 3, or 4 wherein the water-vapor-permeable synthetic polymer coating or film is coated with a substantially air-impermeable layer of water-vapor-permeable hydrophilic polymer.

6. The waterproof water-vapor-permeable composite material of claim 5 wherein the hydrophilic polymer is a hydrophilic polyurethane polymer.

* * * * *